US008667061B2

(12) United States Patent
Kumar

(10) Patent No.: US 8,667,061 B2
(45) Date of Patent: Mar. 4, 2014

(54) ACHIEVING INTEROPERABILITY FOR WEB SERVICES USING A MAP ENGINE

(75) Inventor: Anuj Kumar, Lucknow (IN)

(73) Assignee: Oracle International Corporation, Redwood Shores, CA (US)

( * ) Notice: Subject to any disclaimer, the term of this patent is extended or adjusted under 35 U.S.C. 154(b) by 621 days.

(21) Appl. No.: 12/959,915

(22) Filed: Dec. 3, 2010

(65) Prior Publication Data

US 2012/0143949 A1    Jun. 7, 2012

(51) Int. Cl.
G06F 15/16    (2006.01)
(52) U.S. Cl.
USPC .......................................... 709/204; 707/638
(58) Field of Classification Search
USPC ......................................................... 709/204
See application file for complete search history.

(56) References Cited

U.S. PATENT DOCUMENTS

| 7,660,004 | B2 |  | 2/2010 | Jain | |
|---|---|---|---|---|---|
| 8,332,473 | B1 | * | 12/2012 | Fouts et al. | 709/206 |
| 2005/0138127 | A1 |  | 6/2005 | Jain | |
| 2007/0192351 | A1 | * | 8/2007 | Liu et al. | 707/102 |
| 2008/0133381 | A1 | * | 6/2008 | O'Brien et al. | 705/27 |
| 2008/0294712 | A1 | * | 11/2008 | Lu et al. | 709/202 |
| 2009/0313335 | A1 | * | 12/2009 | Heidasch | 709/206 |
| 2010/0262667 | A1 | * | 10/2010 | Briand et al. | 709/206 |
| 2013/0091293 | A1 | * | 4/2013 | Roshen | 709/230 |

OTHER PUBLICATIONS

Wangming YE; "Web Services Interoperability between J2EE and .NET—Part 1"; Apr. 29, 2005; http:/www.developerfusion.com/article/4694/web-services-interoperability-between-j2ee-a . . . ; p. 1.
"Web Services Overview"; http://publib.boulder.ibm.com/infocenter/rtnlhelp/v6r0m0/topic/com.ibm.etools.webservice; Sep. 9, 2010; pp. 1-4.

* cited by examiner

*Primary Examiner* — Tauqir Hussain
*Assistant Examiner* — Eyob Hagos
(74) *Attorney, Agent, or Firm* — Miles & Stockbridge P.C.

(57) ABSTRACT

Embodiments of the invention address interoperability issues between incompatible applications by use of a map engine. In one embodiment the map engine enables a mapping between the messages exchanged between two incompatible applications thereby enabling the interacting applications understand messages exchanged between them. In other embodiments, the map engine maps a parameter associated with one application to a parameter associated with another application based on a mapping rule, where the applications differ from each other owing to non-conforming standards used for their implementation or to the two applications having different service description formats or different messaging formats, or to different platforms used for their implementation. In another embodiment of the invention, the map engine extracts the mapping rule from a knowledge base to enable the mapping between the two incompatible applications. The knowledge base stores data based on which the parameters associated with the two applications may be mapped.

15 Claims, 15 Drawing Sheets

```
<?xml version="1.0" encoding="UTF-8" standalone="yes"?>
...
<types>
  <xsd:schema>
    <xsd:import namespace="my.example.app.first" schemaLocation="SayHello_App1.xsd">
  </xsd:schema>
</types>
<message name="SayHelloRequest">
  <part name="documentRequest" element="ns1:documentRequest"/>
</message>
<message name="SayHelloResponse">
  <part name="documentResponse" element="ns1:documentResponse"/>
</message>
<portType name="HelloWebServices">
  <operation name="sayHello">
    <input message="ns1:SayHelloRequest"/>
    <output message="ns1:SayHelloResponse"/>
  </operation>
</portType>
...
<service name="FirstHelloService">
  <port name="WebServices" binding="ns1:HelloWebServicesPortBinding">
    <soap:address location="http://localhost:80/services"/>
  </port>
</service>
</definitions>
```

Figure 5c

```
<?xml version="1.0" encoding="UTF-8" standalone="yes"?>
<xs:schema xmlns:xs1="my.example.app.first"... >
<xs:element name="documentRequest">
  <xs:complexType>
    <xs:sequence>
      <xs:element name="field">
        <xs:complexType>
          <xs:sequence>
            <xs:element name="firstName" type="xs:string"/>
          </xs:sequence>
        </xs:complexType>
      </xs:element>
    </xs:sequence>
  </xs:complexType>
</xs:element>
<xs:element name="documentResponse">
  <xs:complexType>
    <xs:sequence>
      <xs:element name="field">
        <xs:complexType>
          <xs:sequence>
            <xs:element name="greeting" type="xs:string"/>
          </xs:sequence>
        </xs:complexType>
      </xs:element>
    </xs:sequence>
  </xs:complexType>
</xs:element>
</xs:schema>
```

Figure 5d

```
<?xml version="1.0" encoding="UTF-8" standalone="yes"?>
...
<types>
 <xsd:schema>
  <xsd:import namespace="my.example.app.second"
schemaLocation="SayHello_App2.xsd"/>
 </xsd:schema>
</types>
<message name="SayHelloRequest">
 <part name="name" element="ns1:firstName"/>
</message>
<message name="SayHelloResponse">
 <part name="greeting" element="ns1:greeting"/>
</message>
<portType name="HelloWebServices">
 <operation name="sayHello">
  <input message="ns1:SayHelloRequest"/>
  <output message="ns1:SayHelloResponse"/>
 </operation>
</portType>
...
<service name="SecondHelloService">
 <port name="WebServices" binding="ns1:HelloWebServicesPortBinding">
  <soap:address location="http://localhost:80/services"/>
 </port>
</service>
</definitions>
```

Figure 5e

```
<xs:element name="name">
    <xs:complexType>
        <xs:sequence>
            <xs:element name="firstName" type="xs:string"/>
        </xs:sequence>
    </xs:complexType>
</xs:element>
<xs:element name="greeting">
    <xs:complexType>
        <xs:sequence>
            <xs:element name="greeting" type="xs:string"/>
```

Figure 5f

```
<soapenv:Envelope
 xmlns:q0="my.example.app.first"
 xmlns:soapenv="http://schemas.xmlsoap.o
 xmlns:xsd="http://www.w3.org/2001/XMl
 xmlns:xsi="http://www.w3.org/2001/XML
 instance">
    <soapenv:Header>
    </soapenv:Header>
    <soapenv:Body>
        <q0:documentRequest>
            <field>
                <firstName>MyName</firstName>
            </field>
        </q0:documentRequest>
    </soapenv:Body>
</soapenv:Envelope>
```

Figure 5g

```
<soapenv:Envelope
  xmlns:q0="my.example.app.second"
  xmlns:soapenv="http://schemas.xmlsoap.o
  xmlns:xsd="http://www.w3.org/2001/XML
  xmlns:xsi="http://www.w3.org/2001/XML
  instance">
  <soapenv:Header>
  </soapenv:Header>
  <soapenv:Body>
    <q0:name>
      <firstName>MyName</firstName>
    </q0:name>
  </soapenv:Body>
</soapenv:Envelope>
```

Figure 5h

ACHIEVING INTEROPERABILITY FOR WEB SERVICES USING A MAP ENGINE

FIELD

The invention is directed generally to a computer system, and, in particular, to a system for providing interoperability for web services.

BACKGROUND

As the Internet has evolved there has been an increased need for communication between applications over a network. Extensible Markup Language (XML) was developed as a flexible way to create common information formats and share both the format and the data between applications. As opposed to Hypertext Markup Language (HTML), which is designed specifically for web browsers, XML is designed for much wider use and is extensible to fit each application.

XML has been widely used for representing application specific data structures, for example in web services. A web service is, for instance, a set of related application functions that can be programmatically invoked over the Internet. Businesses can dynamically mix and match web services to perform complex tasks.

The XML format can be used to facilitate the use of the web service by a remote service requester. Web Services Description Language (WSDL) is an XML-based language for describing web services and how to access them. The service requester can interact with the web service in a manner prescribed by the web service's WSDL description using Simple Object Access Protocol (SOAP) messages, typically conveyed using Hypertext Transfer Protocol (HTTP).

FIG. 1 shows a simplified diagram of the use of a web service 103 by a service requester machine 104. Web services are typically application programming interfaces (API) or web APIs that are accessed via HTTP and executed on a remote system hosting the requested services. World Wide Web Consortium (W3C) defines a web service as a software system designed to support interoperable machine-to-machine interaction over a network. It has an interface described in a machine-processable format, such as WSDL. Other systems interact with the web service in a manner prescribed by its description using SOAP messages, typically conveyed using HTTP with an XML serialization in conjunction with other Web-related standards.

As illustrated in FIG. 1, a service provider machine 102 hosts the web service 103 and makes it accessible using protocols such as SOAP. Web service 103 is described by a WSDL document 101 that may be stored on the provider's server. Web service 103 is published to a service broker 100, such as a Universal Description, Discovery, and Integration (UDDI) service broker. Service broker 100 acts like a phone book with a web service name and a pointer back to WSDL 101.

For service requester 104 to use the remote web service 103, service requester 104 looks up the web service 103 via the phone book (i.e., UDDI service broker 100). More particularly, the service requester machine 104 may host the service request 105. Service requester 104 discovers web service 103 via the UDDI service broker 100. Service broker 100, which has a pointer to the web service's WSDL 101, passes this pointer on to service requester 104, so that service requester 104 can format its SOAP message correctly. Service requester 104 then sends its request to web service 103 using a SOAP message and receives a SOAP response satisfying the request from web service 103.

It should be noted that FIG. 1 is greatly simplified in that many interoperability assumptions are made between service requester machine 104 and server provider machine 102. In practice, a number of platform providers, independent software vendors, and utility software developers have implemented web services protocols (e.g., SOAP and WSDL) in their products. However, ambiguities and the large number of choices in implementation specifics have led to differing interpretations, thereby resulting in incompatible implementations. As a consequence, serious interoperability problems have developed in SOAP-based Web services where one web service implementation may be unable to understand a message from another web service implementation. Thus, there is a need for a technique that enables these differing web service implementations understand the messages exchanged between each other and thereby enabling communication between them.

SUMMARY

One embodiment of the present invention involves retrieving a mapping rule based on a first parameter where the mapping rule enables mapping a first message in a first message format to a second message in a second message format when the first message format and the second message format are different. This embodiment of the present invention involves identifying a first parameter associated with the first message, identifying a first variation associated with the identity of the first parameter, and identifying a mapping rule for the variation. The mapping rule identified provides a second variation associated with the first variation.

Another embodiment of the present invention comprises an apparatus comprising a database server coupled to a database, the database storing information associated with mapping a first parameter of a first set of parameters associated with a first description to a second parameter of a second set of parameters associated with a second description, the first description being different from the second description, Two or more database tables store the information associated with the mapping. The information associated with the mapping comprising a first set of parameters associated with the first description and the second set of parameters associated with the second description, the first set of parameters with a first set of variations and the second set of parameters with a second set of variations, and a mapping between a first variation of the first set of variations and a second variation of the second set of variations, Another embodiment of the present invention comprises a computer implemented method for creating a mapping rule for mapping a first message in a first message format to a second message in a second message format, the second message format different from the first message format. The method of the present invention comprising identifying a first element from a first description associated with the first message format, identifying a second element from a second description associated with the second message format, storing in a first table in a memory, the first element with a first identity and the second element with a second identity, storing in a second table in the memory, the first identity with a first variation and the second identity with a second variation, and storing in a third table in the memory, the mapping rule associating the first variation with the second variation.

Another embodiment of the present invention involves a computer implemented mapping system for allowing communication between a service requester and a service provider where the service requester has a first message format and the service provider has a second message format different from the first message format. The system comprises a map engine for transforming a message in the first message format to a message in the second message format. The system also comprises a knowledge base stored coupled to the map engine and stored in a computer database where the knowledge base provides mapping rules to the map engine to transform the messages. The knowledge base comprises: a domain table for storing a plurality of elements associated with the first message format and with the second message format with a corresponding identity for each element of the plurality of elements, a variation table for storing an association between the identity of each element of the plurality of elements of the domain table and a variation of that element, and a rule table for storing a mapping between a first variation from the variation table and a second variation from the variation table, the variation corresponding to a version, platform, an application type or any combination thereof.

Another embodiment of the present invention comprises a method for associating a first set of parameters of a first data type with a second set of parameters of a second data type using a third data type wherein the first data type, the second data type, and the third data type are different. The method comprises storing in a first table in a database, the first set of parameters, the second set of parameters and a third set of parameters of a third data type with a corresponding first set of identities, second set of identities, and a third set of identities respectively. The method further comprises storing in a second table in the database, the first set of identities, the second set of identities, and the third set of identities with a corresponding first set of variations, a second set of variations, and a third set of variations respectively. The method further comprises storing in a third table in the database, an association between a first variation of the first set of variations and a third variation of the third set of variations and an association between a second variation of the second set of variations and the third variation, These and other features of the embodiments of the present invention will be described in more detail below.

BRIEF DESCRIPTION OF THE DRAWINGS

FIG. 4b is a flowchart illustrating the operation of the map engine to generate the mapping information for the embodiment of the invention depicted in FIG. 4a.

FIG. 5b is a flowchart illustrating the operation of the map engine to generate the mapping information for the embodiment of the invention depicted in FIG. 5a.

FIGS. 5c and 5e are WSDL files for the service provider and service requester respectively, illustrating an example embodiment of the invention.

FIGS. 5d and 5f are schema definition files for data types used in the WSDL documents of the service provider and service requester respectively, illustrating an example embodiment of the invention.

FIGS. 5g and 5h are SOAP messages generated by the service provider and the service requester respectively, illustrating an example embodiment of the invention.

DETAILED DESCRIPTION

Figure 1:
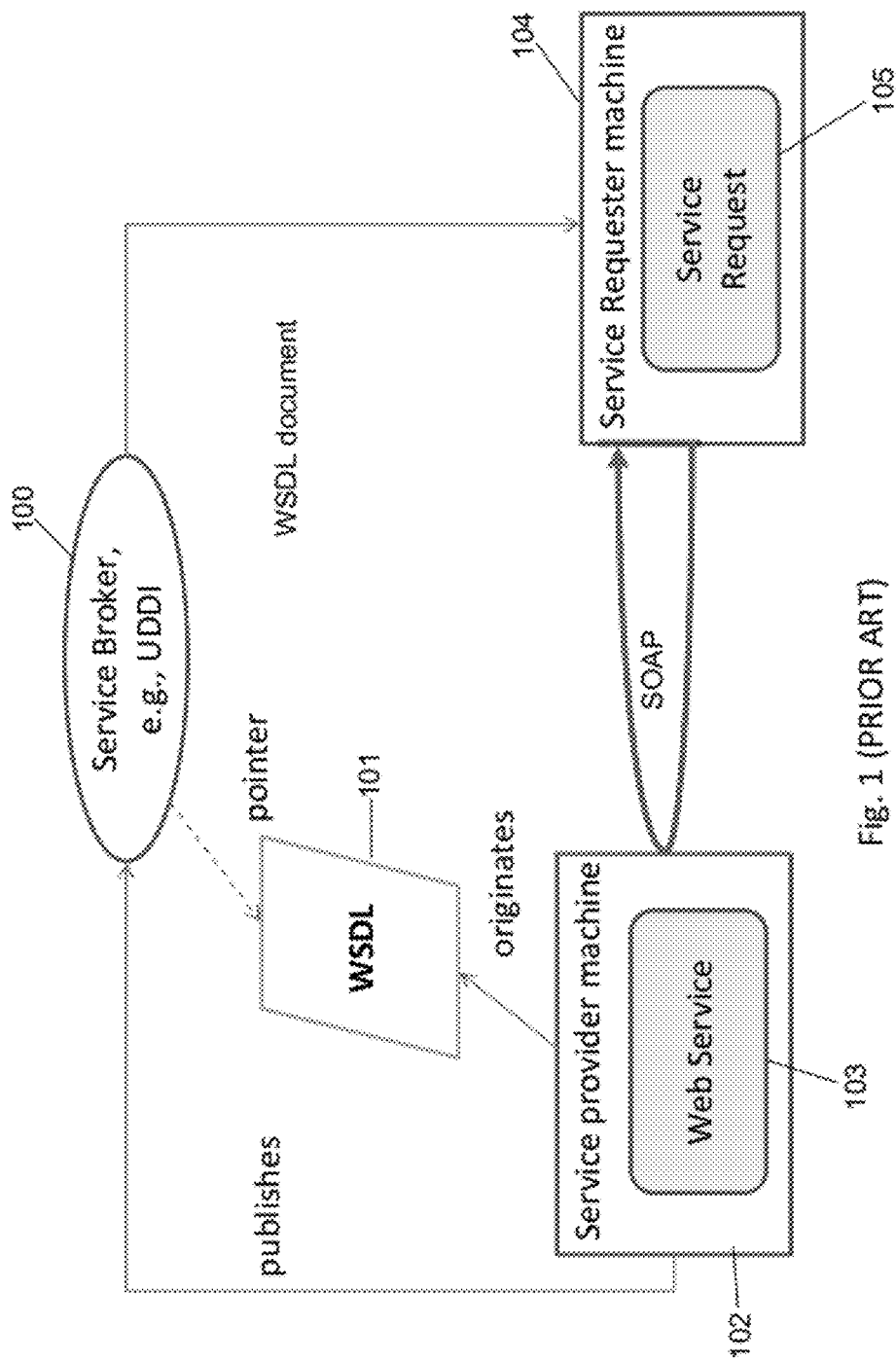
FIG. 1 illustrates a block diagram of a prior art system.

Embodiments of the invention address several interoperability scenarios for two incompatible applications. Several embodiments of the invention address interoperability scenarios when the two interacting applications, for example, are web service applications involving a requester web service and a provider web service. In one such embodiment, the interacting applications comprise a requester web service or a service requester initiating a request to invoke the operations of the service provided by the provider web service. In another example, the two incompatible applications may be a software application, web application, mobile application, or any application capable of communicating over the Internet or other wired or wireless network. Web service applications may be incompatible when they are implemented on different platforms having different data types, or are implemented using different standard specifications, different vendor implementations, or due to use of different WSDL documents for their service descriptions.

One embodiment of the present invention comprises a map engine for generating and storing a mapping rule that enables mapping of one parameter to another parameter. One parameter may be associated with one application and the another parameter may be associated with another application, where the two applications may be different with respect to their service descriptions, their messaging format, or their implementations arising from implementations based on different specifications or implementation using different platform data types, or any combination thereof. Such parameters may correspond to one of an element, an attribute, a variable, or any type of data associated with the applications with respect to the service descriptions, the messaging formats, specifications for the implementation, or the implementation platforms of the two applications. The map engine accesses a description associated with each of the parameters to be mapped, where, for example, the description may correspond to one of, the specifications used for implementation of the two applications, service descriptions such as a WSDL document of the two applications, or a list of platform data types of the two applications. Another embodiment of the present invention comprises a map engine that retrieves a mapping rule in response to a request.

Another embodiment of the present invention comprises a map engine that, based on a mapping rule, generates mapping information that maps parameters associated with two applications such as a service requester and a service provider when the service requester and the service provider have different messaging formats. The different messaging formats may be due to the applications being incompatible for being implemented using different specifications, or having different vendor implementations, or having different WSDL documents for their service descriptions. In this context the parameters are associated with the messages exchanged and may correspond to one of an element, an attribute, a variable, or any type of data associated with the applications. The mapping information comprises mapped parameters populated with values extracted from a message that enables interoperability between the two applications. Another embodiment of the present invention comprises a knowledge base that stores parameters and information associated with the parameters and mapping rules to enable mapping between the parameters.

One embodiment of the present invention provides interoperability for the web services when the web service at the service requester and the web service at the service provider are implemented using standards based on different specifications. Examples of interoperability issues due to implementations based on different standards include the use of non-conforming standards by the service requester and the service provider, such as SOAP 1.1 and SOAP 1.2. SOAP Version 1.2 has a number of changes in the message syntax and provides additional semantics from those described in SOAP 1.1. Accordingly, the two versions may not be compatible. It should be noted that embodiments of the invention address other issues as well with respect to non-conforming web services standards and is not limited to the example of SOAP 1.1 and SOAP 1.2 version incompatibility.

Another embodiment of the present invention addresses interoperability for outbound web service where a requesting application (service requester) provides an outbound web service definition using a WSDL and a provider application or a provider web service (service provider) provides the implementation for that outbound web service. The requesting application may use its outbound web service configurations to invoke the operations implemented by the service provider. However, interoperability issues may arise when the service provider implements the outbound web service using a different WSDL than the outbound web service definition or WSDL provided by the requesting application, or when the service provider implements the outbound web service using a different SOAP message format than that required by the requesting application, or when the service provider implements the outbound web service using a web service stack different from that expected by the requesting application. Such scenarios may arise, for example, when the requesting application is itself a web service provider and for one or more of its operations supports an outbound web service configuration providing an outbound web service definition for such operations and using this definition the service provider is expected to implement the outbound web service for such operations. However, interoperability issues may arise when the service provider implements the outbound web service using a web service stack, or SOAP message format, or WSDL document that is different from that expected by the requesting application. Such an embodiment of the invention comprises a SOAP engine operating between the requesting application (service requester) and the service provider where the SOAP engine comprises a map engine to generate a mapping between the formats of the service requester and the service provider. The SOAP engine internally implements a web service using the web service definition or the WSDL provided by the service requester and implements a web service client using the WSDL of the service provider.

According to certain embodiments of the invention the map engine dynamically generates a mapping rule when a service requester initiates a request to access the operations of a service provider. According to such embodiments, the map engine intercepts the request and generates the mapping information according to the interoperability scenario discussed above. In order to generate the mapping rule, the map engine accesses information associated with the message formats of the service requester and the service provider where such information provides a description associated with message the format. For example, when the message formats of the messages generated by the service requester and the service provider is different due to each using a different WSDL document, then the information associated with the message format is the WSDL document. When the service requester and the service provider each use different versions of SOAP then information associated with their message formats is the corresponding SOAP specification such as SOAP 1.1 and SOAP 1.2.

One embodiment of the present invention addresses interoperability when the web service applications are implemented on different platforms having different platform data types. In this context, the parameters are the data types defined for the different platforms, and the mapping rule defines an association between two parameters or one platform data type to another platform data type.

Another embodiment of the present invention where the web service applications may be implemented on different platforms comprises evaluating a web service implementation to determine whether such an implementation may result in interoperability issues for web service. In this embodiment, mapping rules that map two parameters or two data types of two different platforms are stored in a knowledge base. The map engine parses the web service implementation to determine whether mapping rules for the data types used in the web service implementation are stored in the knowledge base.

According to certain other embodiments of the invention, the map engine has access to a knowledge base that stores the mapping rule that is used for mapping the parameters associated with different web service applications based on each interoperability scenario. Knowledge base includes a plurality of tables to assist in the mapping discussed above. In some embodiments, the knowledge base includes at least one application knowledge table, domain table, variation table, and rule table.

An application knowledge table stores the name of all the applications that are using the knowledge base. It also assigns a Knowledge ID that is used as a reference to store application specific domain objects and other details. Application knowledge table has two fields: "Knowledge ID" and "AppName." An example of an Application Knowledge table is shown in Table 1.

TABLE 1

| Knowledge ID | AppName |
| --- | --- |
| K1 | SOAP Standards |
| K2 | Development Platforms |
| K3 | Application Integration |

Knowledge base may also include a domain table that stores all of the elements of a domain. The domain table assigns an element ID to each domain element. It also stores the element name and description. The domain table includes four fields: "Knowledge ID," "element ID," "name," and "description." The "Knowledge ID" refers to the Knowledge ID defined in the application Knowledge table discussed above.

A variation table associates an element with a variation such as the version, platform, and/or an application type. The variation table has three fields: "var ID," "element ID," and "variation." The "var ID" field stores a unique variation ID for each entry in the table. "Element ID" refers to an ID defined in the domain table, and "variation" defines the version, platform or application name depending on the context in which the variation is being defined.

The rule table stores mapping rules based on an interoperability scenario or based on the context in which the mapping rule is being defined. It has three fields: "rule ID," "var ID," and "var IDM." The "rule ID" stores a unique ID for the rule, and the "var ID" and "var IDM" fields refer to a var ID defined in the variation table discussed above. In effect, a mapping rule represented by a rule ID in the rule table maps one variation to another variation. In one embodiment each variation in the mapping rule may be associated with a different Knowledge ID. In another embodiment each variation in the mapping rule may be associated with the same Knowledge ID.

In addition to the above, the knowledge base may also store user defined mapping between the elements. Using such information stored in the Knowledge table the map engine can generate the mapping information to transform the messages or the request/response between the two formats of the service requester and the service provider. The tables stored in the knowledge base are described in further detail along with the detailed description of the embodiments of the invention.

The sections below provide a detailed description of the embodiments of the invention with reference to the corresponding Figures.

Figure 2:
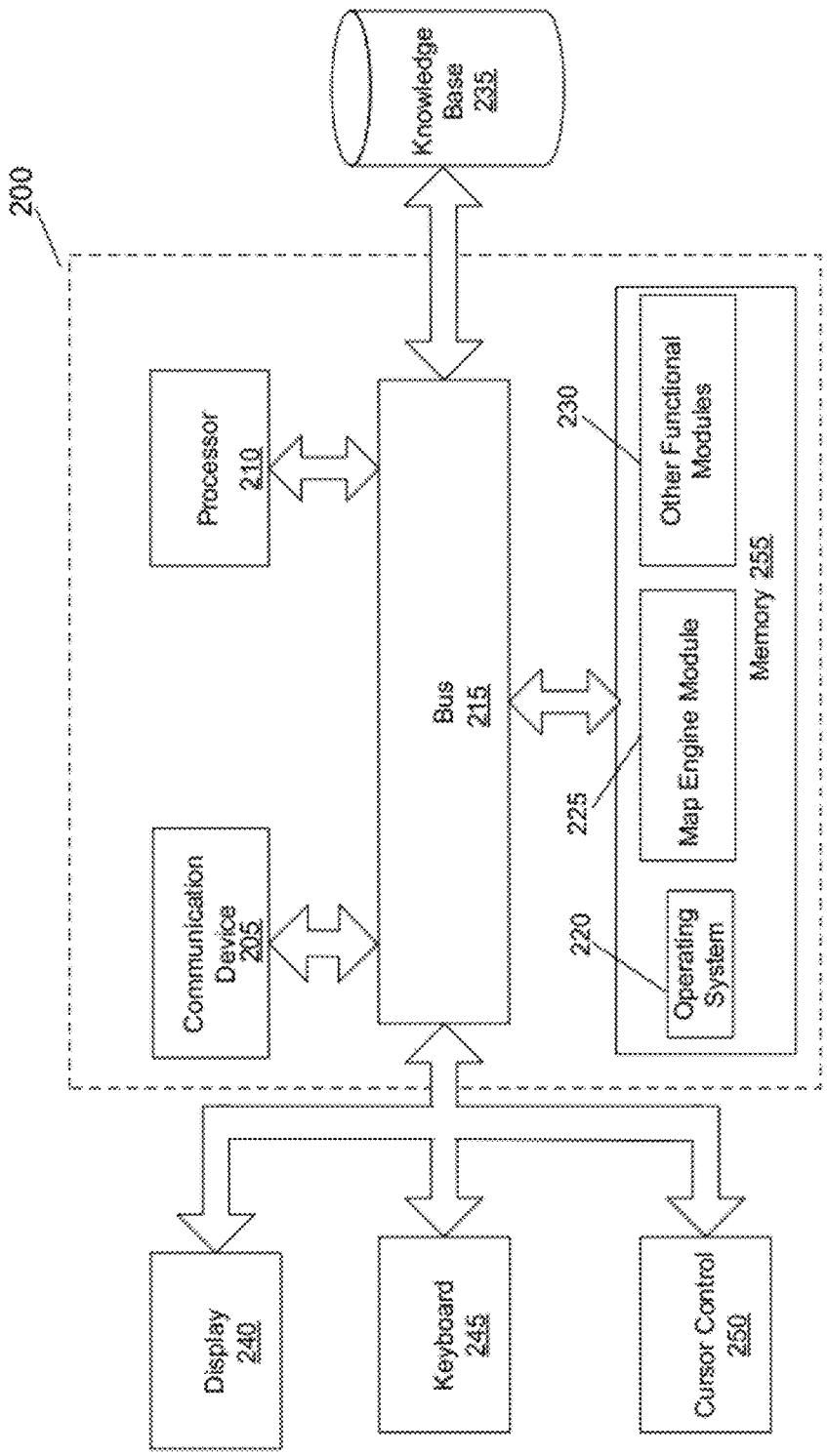
FIG. 2 illustrates a block diagram of an apparatus, according to an embodiment of the invention.

FIG. 2 illustrates a block diagram of an apparatus 200 that may implement one embodiment of the invention. In certain embodiments, Apparatus 200 may be a SOAP engine and/or map engine.

Apparatus 200 includes a bus 215 or other communications mechanism for communicating information between components of apparatus 200. Apparatus 200 also includes a processor 210, coupled to bus 215, for processing information and executing instructions or operations. Processor 210 may be any type of general or specific purpose processor. Apparatus 200 further includes a memory 255 for storing information and instructions to be executed by processor 210. Memory 255 can be comprised of any combination of random access memory ("RAM"), read only memory ("ROM"), static storage such as a magnetic or optical disk, or any other type of machine or computer readable media. Apparatus 200 further includes a communication device 205, such as a network interface card or other communications interface, to provide access to a network and to facilitate the transmission and receipt of data. As a result, a user may interface with apparatus 200 directly or remotely through a network or any other method.

Computer readable media may be any available media that can be accessed by processor 210 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 210 is further coupled via bus 215 to a display 240, such as a Liquid Crystal Display ("LCD"), for displaying information to a user, such as mapping information. A keyboard 245 and a cursor control device 250, such as a computer mouse, are further coupled to bus 215 to enable a user to interface with apparatus 200. Processor 210 and memory 255 may also be coupled via bus 215 to a knowledge base 235 and, thus, may be able to access and retrieve information stored in knowledge base 235. In one embodiment, memory 255 stores software modules that provide functionality when executed by processor 210. The modules may include an operating system 220 that provides operating system functionality for apparatus 200. The memory may also store map engine module 225, which may be used to derive, update, and/or retrieve mapping information from knowledge base 235. Apparatus 200 may also include one or more other functional modules 230 to provide additional functionality. Examples of other functional modules 230 may include an information rights management module or a universal content management module.

Interoperability for Web Services Using Different Standard Specifications

Figure 3:
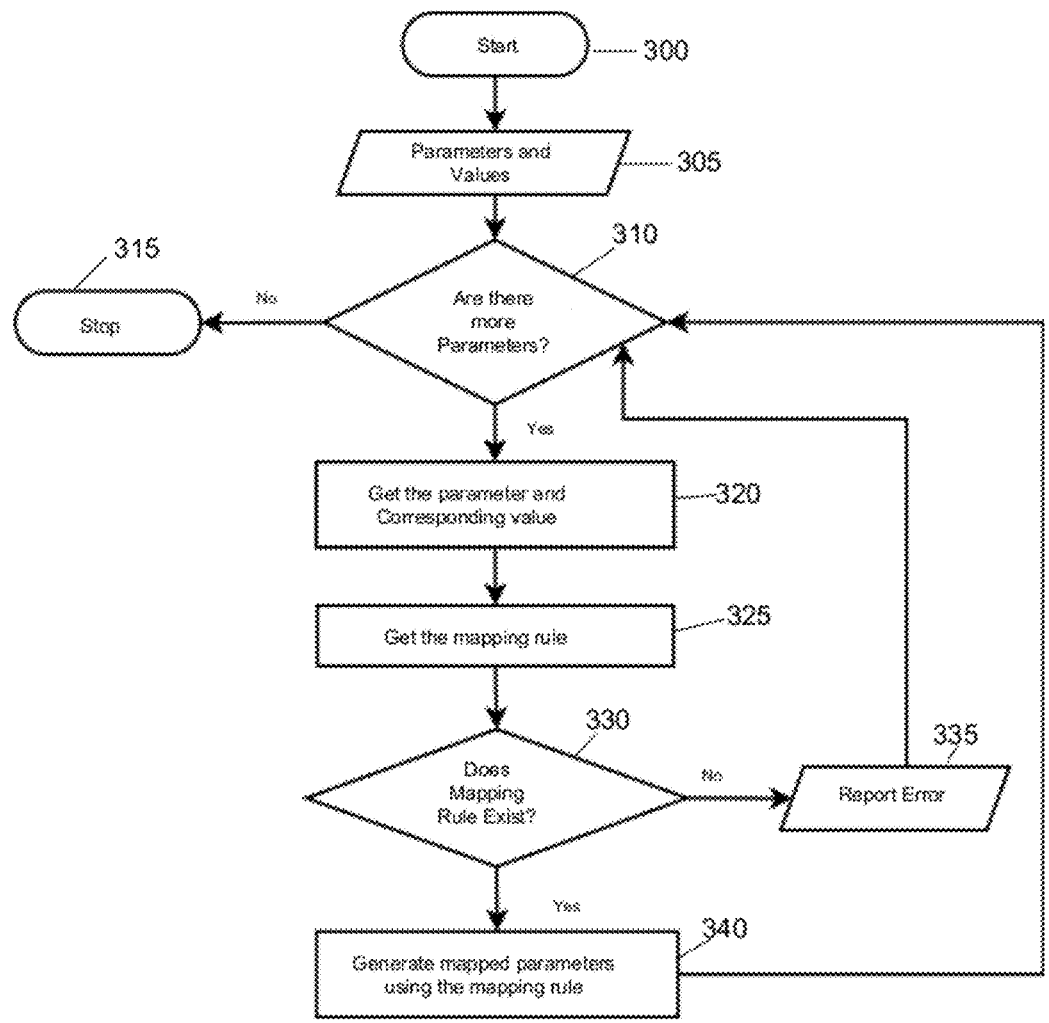
FIG. 3 is a flowchart illustrating the operation of the map engine according to an embodiment of the invention.
Figure 4A:
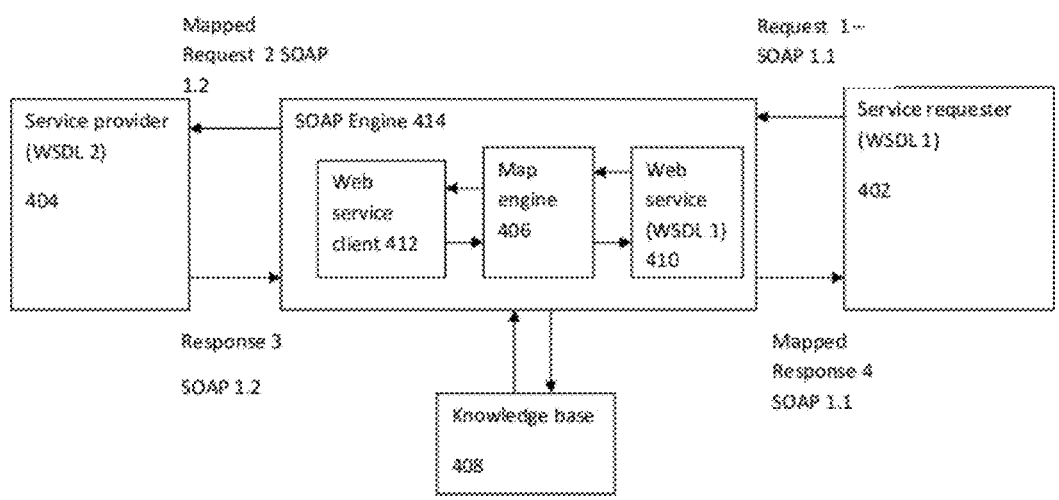
FIG. 4a is a functional block diagram according to an embodiment of the invention, comprising a service requester, a service provider, a SOAP engine and a map engine to map the messages exchanged between the service requester and the service provider using mapping information generated from the map engine.
Figure 4B:
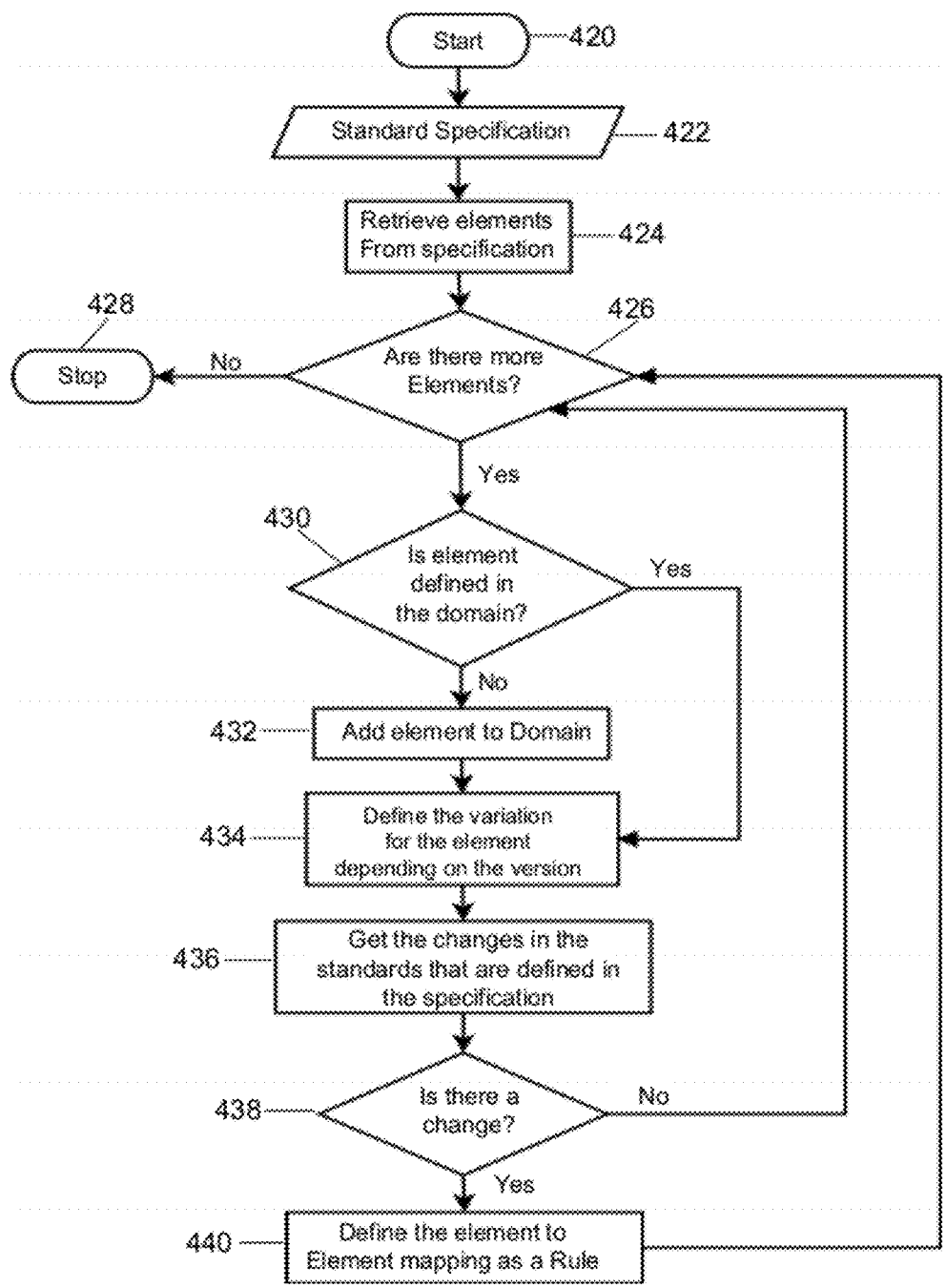

In one embodiment interoperability for two web services each using different standard specifications and interested in communicating with each other, is explained with respect to FIGS. 3, 4a, and 4b. FIG. 3 illustrates the operation of the map engine to retrieve a mapping rule and generate the mapping information according to various embodiments of the invention. FIG. 4a is a functional block diagram comprising a service requester 402, a service provider 404, a SOAP engine 414 that maps the messages exchanged between the service requester 402 and the service provider 404 using mapping information generated from a map engine 406. The system also comprises a knowledge base 408. The SOAP engine 414 internally implements a web service 410 using the web service definition or the WSDL 1 provided by the service requester 402. The SOAP engine 414 also implements a web service client 412 using the WSDL 2 provided by the service provider 404. The web service 410 as well as the client 412 can be generated using a standard integrated development environment (IDE) such as Oracle JDeveloper® by Oracle International Corporation, or any other code generation mechanism. The web service 410 is used to internally invoke the operations of the web service provided by the service provider 404 based on a request 1 received from the service requester 402 where request 1 is a request to access the operations of the web service provided by the service provider 404. The client 412 is used to interact with the service provider 404 with a mapped request 2, which is generated using the mapping information generated by the map engine 406.

Each functional module in FIG. 4a is capable of communicating with the other module as indicated in the FIG. 4a using standard Internet communication protocols. The service requester 402 is a functional representation of a web service or at least a service request hosted on a machine or an apparatus and the service provider 404 is a functional representation of a web service hosted on a machine. The map engine 406 is a functional representation of a module hosted on a machine where such a module comprises a sequence of instructions stored on a memory and executable by a processor. In an example embodiment, the functionality of the map engine 406 may itself be exposed as a service for consumption by applications on the Internet. In one embodiment, each such machine described above may be a server machine comprising a processor, a memory storing instructions and executable by the processor, and a communication device capable of communicating with other machines on the Internet using standard communicating protocols. The knowledge base 408 according to one embodiment may include a database server and any type of database, such as a relational or flat file database.

FIGS. 4a and 4b illustrate an embodiment of the invention that addresses the interoperability for web services when the service requester 402 and the service provider 404 are implemented using standards based on different specifications or when the service requester 402 and service provider 404 differ in their SOAP message structures based on the schema definition in their respective WSDL. For example, service requester 402 conforms to the SOAP 1.1 specification for messaging and service provider 404 conforms to the SOAP 1.2 specification. According to such an embodiment, the SOAP engine 414 mediates the request/response messages between the service requester 402 and the service provider 404 and maps the message from the format of the service requester 402 to the format of the service provider 404 and vice versa. Service requester 402 initiates a request 1, for example a message conforming to SOAP 1.1 standard, to invoke an operation of the service provided by service provider 404. The SOAP engine 414 receives the request 1 message from the service requester 402 and delegates the request 1 to the map engine 406.

FIG. 3 is a flowchart illustrating the operation of the map engine 406 to retrieve a mapping rule and generate the mapping information. The flowchart of FIG. 3 begins when the map engine 406 receives a request comprising one or more parameters, to retrieve corresponding mapped parameters. For example, a request comprising parameters extracted from the request 1 received by the SOAP engine 414 from the service requester 402, where such parameters are associated with a SOAP message in SOAP 1.1 format. In one example, the parameters are associated with the elements in a SOAP envelope. At step 305 of the flowchart of FIG. 3 the map engine 406 generates a list of parameters present in the request. At step 310, the map engine 406 determines if there are any more parameters in the request and the flowchart stops at step 315 if there are no more parameters in the request. If at step 310 more parameter(s) are identified then the flowchart proceeds to step 320.

At step 320, for one or more parameters identified at steps 305 and 310 the map engine 406 extracts their corresponding values from the request. For example, with respect to SOAP 1.1 request 1, the map engine generates a map of values as: MapOfValues<<faultcode, value1><faultstring, value2>>. At step 325 the map engine 406 retrieves from the knowledge base 408, a mapping rule for each of the parameters identified at steps 305 and 310. According to one embodiment the map engine 406 generates the mapping rule according to the method illustrated in the flowchart of FIG. 4b and stores the mapping rule in the knowledge base 408. According to another embodiment, the mapping rule is user-defined and stored in the knowledge base 408. At step 330, if it is determined that the mapping rule associated with the parameters comprised in the request does not exist in the knowledge base 408 then an error is reported at step 335. If the mapping rule exists in the knowledge base 408 then at step 340, the map engine 406 generates the mapping information that comprises the mapped parameters according to SOAP 1.2 specification populated with values identified from request 1. For example, according to the mapping rules stored in a rule table 4 of the knowledge base 408, faultcode element in SOAP 1.1 maps to env:Code element in SOAP 1.2, faultstring in SOAP 1.1 maps to env:Reason in SOAP 1.2. Using the MapOfValues and such mapping rules retrieved from the knowledge base 408 the parameters env:Code and env:Reason of SOAP 1.2 specification are populated with value1 and value2 respectively. Using the mapped parameters with corresponding values, env:Code>>value1 and env:reason>>value2, the client 412 generates a mapped request 2 which is according to SOAP 1.2 specification. The mapped request 2 invokes the requested operation of the web service provided by service provider 404.

FIG. 4b is a flowchart illustrating the manner in which the map engine 406 generates the mapping information and stores it in a memory such as the knowledge base 408, when the service requester 402 and the service provider 404 are implemented using different standard specifications.

The flowchart of FIG. 4b begins at step 420 and, at step 422 the map engine 406 receives as input, for example, the standard specifications of SOAP 1.1 and SOAP 1.2 used for implementing the service requester 402 and the service provider 404. At 424, the elements of SOAP 1.1 and SOAP 1.2 messages are retrieved from the specification and stored in a domain table of the knowledge base 408. For example, from SOAP specifications, SOAP 1.1 elements and attributes retrieved are faultcode, faultstring, actor and the SOAP 1.2 elements and attributes retrieved are role, code, and reason. At 426, it is determined based on the input if there are any elements to be retrieved, if not, then the method stops at 428. If there is an element to be retrieved, then, at 430, it is determined whether the element is defined in the domain table of the knowledge base 408. If the element is not defined in the domain table, then that element is added to the domain table at 432. When the element is already defined in the domain table or once it is added to the domain table, then at step 434 the variation for the element is defined in the variation table depending on the version of the standard to which the element belongs. Next, at 436, the changes in the standards that are defined in the specification are retrieved. At 438, it is determined whether there is a change defined. If there is a change, then the element to element mapping is defined as a mapping rule in the rule table at 440. The mapping rule is defined with respect to the variations of the two elements and maps one variation to another variation. The changes between the SOAP 1.1 and SOAP 1.2 standard specifications may be derived, for example, from a standard specification that lists the changes between the two specifications. If there is no change, then the method returns to 426 to determine if there are more elements to be mapped. The mapping information generated from the flowchart of FIG. 4b is stored in the domain table, variation table, and rule table of the knowledge base 408 as shown below in tables 2, 3, and 4 respectively and represents specific changes between SOAP 1.1 and SOAP 1.2 versions. The domain table 2 comprises elements used in SOAP messages in SOAP 1.1 and SOAP 1.2 format. The variation table 3 associates the elements of the SOAP messages as listed in the domain table 2 with their corresponding SOAP version. The rule table 4 stores mapping rules where each mapping rule represents an association between two variations, where one variation corresponds to SOAP 1.1 and another variation corresponds to SOAP 1.2. More specifically, the mapping rules stored in the rule table 4 defines rules that represent the differences, if any, between SOAP 1.1 and SOAP 1.2 for each element in the domain table 2. The SOAP versions may differ in their syntax, structure of the SOAP messages, etc. For example, the rule table 4 stores information representing the change of syntax between the two SOAP versions. For example, according to the mapping rule K1V21R1 in the rule table, as derived from the domain table 2 and variation table 3, variation K10001V2 maps to variation K10002V1. Therefore, according to this mapping rule, the attribute env:role, K10001V2, of SOAP 1.2 maps to the attribute env:actor, K10002V1, of SOAP 1.1. Further, according to rule K1V21R2, SOAP 1.2 element env:Code, K10003V2, maps to attribute faultcode, K10005V1 of SOAP 1.1 and according to rule K1V21R3, SOAP 1.2 element env: Reason, K10004V2, maps to attribute faultstring, K10006V1 of SOAP 1.1. Using such mapping rules from the rule table 4 the map engine 406 is capable of transforming the request 1 to mapped request 2 in SOAP 1.2 format.

TABLE 2

| Knowledge ID | Element ID | Name | Description |
|---|---|---|---|
| K1 | K10001 | role | Used to address the Header element to a specific endpoint |
| K1 | K10002 | Actor | Used to address the Header element to a specific endpoint |
| K1 | K10003 | Code | Used to report the exception |
| K1 | K10004 | Reason | Used to report reason for error |
| K1 | K10005 | faultcode | Used to report the exception |
| K1 | K10006 | faultstring | Used to report the error message |
| ... | ... | ... | ... |

TABLE 3

| Var ID | Element ID | Variation |
|---|---|---|
| K10001V2 | K10001 | 1.2 |
| K10002V1 | K10002 | 1.1 |
| K10003V2 | K10003 | 1.2 |
| K10004V2 | K10004 | 1.2 |
| K10005V1 | K10005 | 1.1 |
| K10006V1 | K10006 | 1.1 |
| ... | ... | ... |

TABLE 4

| Rule ID | Var ID | Var IDM |
|---|---|---|
| K1V21R1 | K10001V2 | K10002V1 |
| K1V21R2 | K10003V2 | K10005V1 |
| K1V21R3 | K10004V2 | K10006V1 |

Based on the mapped request 2 received from the SOAP engine 414, the service provider 404 responds to client 412 with a response 3 which is in the format of SOAP 1.2 as supported by the service provider 404. The SOAP engine 414 transforms this response 3 to mapped response 4 in SOAP 1.1 format for the service requester 402. The operation of the SOAP engine 414 for such transformation is similar to the operation of the SOAP engine 414 as described above for transforming request 1 to mapped request 2. The map engine 406 generates a MapOfValues for the parameters in response 3, the map engine 406 retrieves the mapping rule from the knowledge base 408 for each of the parameters in response 3 and generates mapped parameters with their corresponding values as identified in response 3. Further, based on such mapped parameters of response 3 the web service 410 generates the mapped response 4 for the service requester 402 where the mapped response 4 is according to SOAP 1.1 format.

According to another embodiment of the invention, the system illustrated in FIG. 4a is also capable of addressing interoperability issue when the service requester and the service provider have different structure of SOAP messages depending on the schema defined in their corresponding WSDL documents.

Interoperability for Outbound Web Service

Figure 5A:
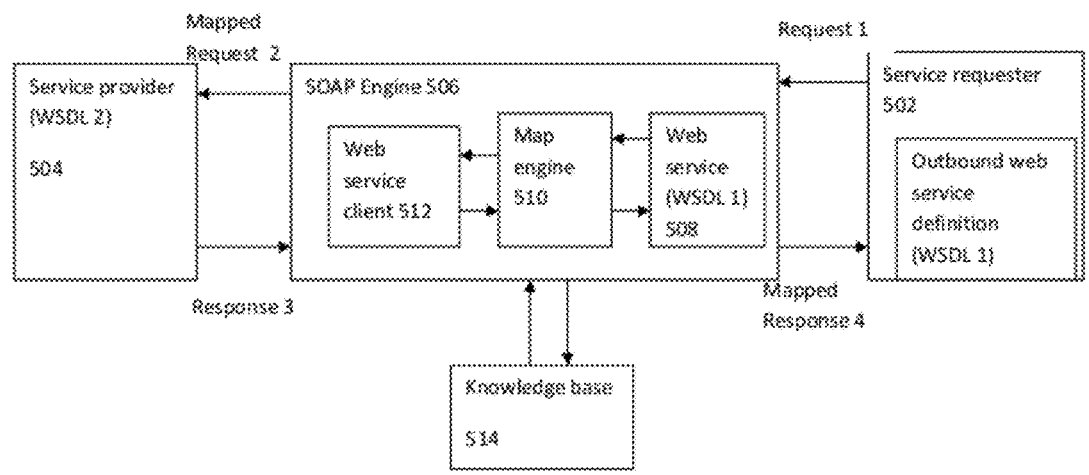
FIG. 5a is a functional block diagram according to an embodiment of the invention, comprising a service requester, a service provider, a SOAP engine and a map engine to map the messages exchanged between the service requester and the service provider using mapping information generated from the map engine.
Figure 5B:
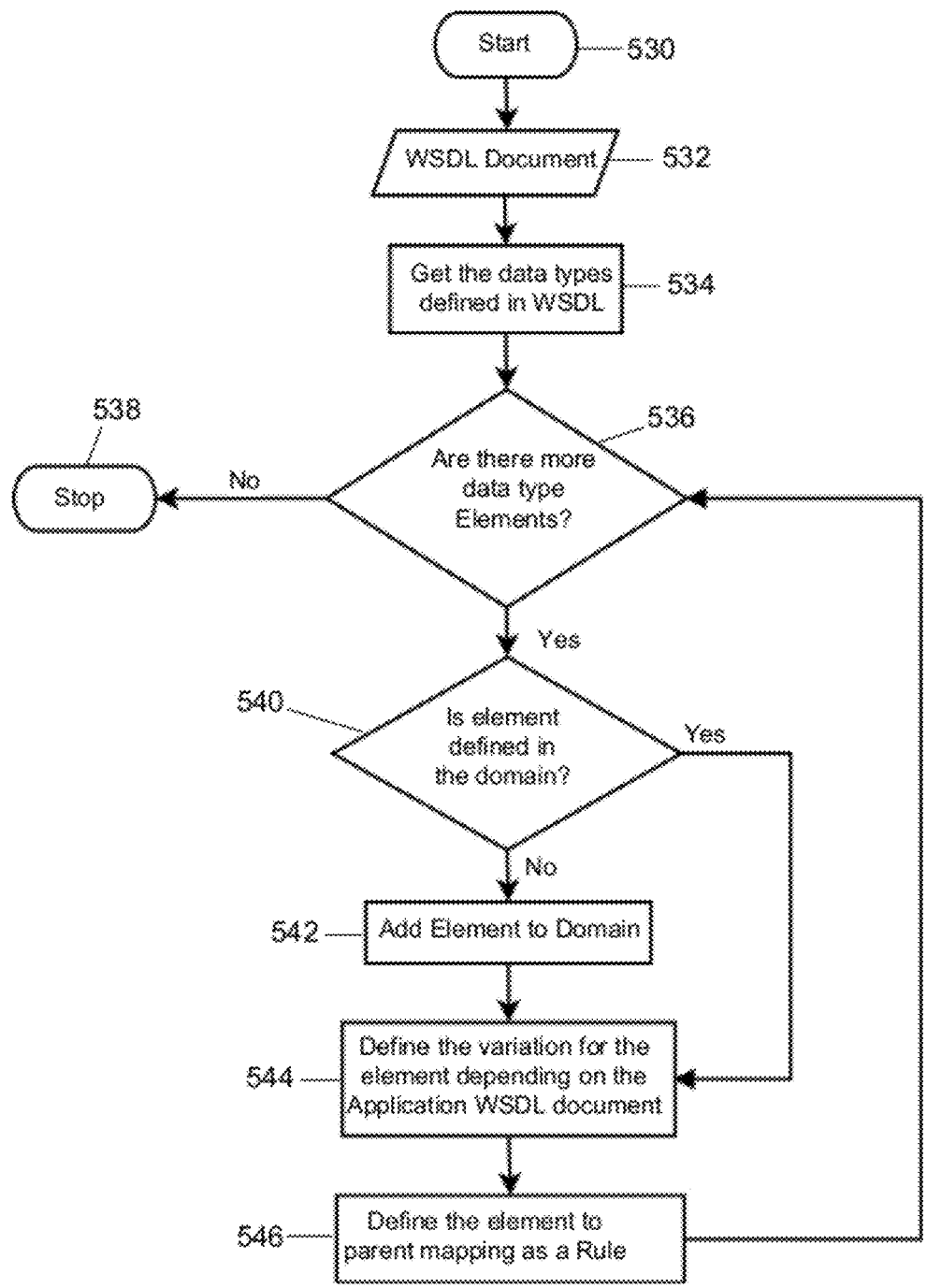

In one embodiment interoperability for outbound web services is explained with respect to FIGS. 3, 5a, 5b, and examples of FIGS. 5c-5h. FIG. 3, as described above, illustrates the operation of a map engine to retrieve a mapping rule and generate mapping information used for mapping the messages exchanged between the service requester and the service provider. FIG. 5a is a functional block diagram and FIG. 5b is a flowchart illustrating an embodiment of the invention that addresses the interoperability issue for outbound web services. The requesting application or the service requester 502 provides an outbound web service definition using a WSDL and a provider application or the service provider 504 provides the implementation for that outbound web service. Interoperability issues may arise when the service requester 502 and the service provider 504 may support different SOAP messaging formats or may use different stacks for implementation of their web services or when the service provider 504 may implement the outbound web service using a WSDL that is different from the WSDL provided by service requester 502. The example embodiments illustrated in FIGS. 5c through 5h address interoperability issues for outbound web services when the service requester provides the outbound web service definition using a WSDL 1 FIG. 5e, and the service provider implements the outbound web service using a WSDL 2 FIG. 5c, that is different from WSDL 1. Although, FIGS. 5a to 5h have been described below with reference to interoperability issues for outbound web services specifically for different WSDL scenario, it must be appreciated that the teachings of FIGS. 5a-5h enable one skilled in the relevant art to address other interoperability issues for outbound web services as discussed above.

FIG. 5a is a block diagram comprising a SOAP engine 506, a service requester 502, a service provider 504, a map engine 510, and a knowledge base 514 and illustrates the functionality of the system of the invention according to the current embodiment. The SOAP engine 506 operates between the service requester 502 and the service provider 504 where the SOAP engine 506 maps the messages exchanged between the service requester 502 and the service provider 504 using mapping information generated by the map engine 510. In one embodiment the map engine 510 uses a mapping rule retrieved from the knowledge base 514 in order to generate the mapping information while in another embodiment the map engine 510 generates the mapping information dynamically by accessing the WSDL documents of the service requester 502 and the service provider 504. The SOAP engine 506 internally implements a web service 508 using the web service definition or the WSDL 1 of FIG. 5e provided by the service requester 502. The SOAP engine 506 also implements a web service client 512 using the WSDL 2 of FIG. 5c provided by the service provider 504. The web service 508 as well as the client 512 can be generated using a standard integrated development environment (IDE) such as Oracle JDeveloper® by Oracle International Corporation, or any other code generation mechanism. The web service 508 is used to internally invoke the operations of the web service provided by the service provider 504 based on a request 1, such as the SOAP message shown in FIG. 5h, received from the service requester 502. The client 512 is used to interact with the service provider 504 with a mapped request 2, such as the SOAP message in FIG. 5g, generated by the SOAP engine 506. The service requester 502 initiates the request 1 to invoke the service 508 defined by the SOAP engine 506 and the request 1 gets served by the web service implemented by the service provider 504. In one embodiment the SOAP engine 506 delegates a request, comprising parameters associated with the request 1, to the map engine 510. As described above from steps 305 to 320 of flowchart of FIG. 3, the map engine 510 extracts the parameters in the request and for one or more parameters generates the MapOfValues by extracting their corresponding values from the request. For example, with respect to FIG. 5h, the map engine 510 extracts parameters corresponding to the elements in the body of the SOAP message such as, name and firstName and the corresponding MapofValues<<firstName, MyName>>. At step 325 the map engine 510 retrieves from the knowledge base 514, the mapping rule for each parameter extracted from the request in steps 305 to 320. In a rule table 7 as shown below, the knowledge base 514 stores the parent of each element in each of the WSDL documents. Based on the information stored in the rule table 7, for the example of FIGS. 5h and 5g, the map engine 510 is able to identify the parent of the firstName element as field with respect to WSDL 2 and as name with respect to WSDL 1, thereby mapping the firstName element of WSDL 1 to the firstName element of WSDL 2 and vice versa. Accordingly, the map engine 506 populates the firstName element of WSDL 2 with the value "MyName". Based on such mapped parameters from the map engine 506, the client 512 generates a mapped request 2, such as the SOAP message shown in FIG. 5g, which is in the format supported by service provider 504. With the mapped request 2, the client 512 invokes the requested operation provided by the service provider 504.

In one embodiment of the invention when the map engine 510 receives the request, at step 325 of the flowchart of FIG. 3, the map engine 510 accesses the WSDL documents of the service requester 502 and the service provider 504 and dynamically generates the mapping rule according to the method illustrated in the flowchart of FIG. 5b. The map engine 510 may use temporary storage such as memory 255 shown in FIG. 2 to temporarily store any intermediate information as required in the process for generating the mapping rule. In another embodiment the map engine 510 generates the mapping rule according to the flowchart of FIG. 5b and stores the mapping rule in the knowledge base 514. When the map engine 510 receives the request 1, the map engine 510 accesses the knowledge base 514 and retrieves the mapping rule.

According to FIG. 5b, the map engine accesses WSDL 1 and WSDL 2 and/or their corresponding schema definitions, FIGS. 5d and 5f, respectively. Using this information the map engine 510 generates a list of parameters corresponding to the elements, sub-elements or attributes in the WSDL documents which are then stored in the domain table of knowledge base 514 as shown in table 5 below. The variation table 6 stores the association between each of the elements of the domain table 5 with their corresponding application, where APP 1 corresponds to the service provider 504 and APP2 corresponds to the service requester 502. The rule table 7 stores mapping rules where each mapping rule represents an association between two variations depicting parent child relationship between the variations. For example, one mapping rule represents an association between the variation of a parent and the variation of the child where N/A signifies that the element is a root element. The rule table may be derived from the schema itself, FIGS. 5d and 5f. For example, based on the domain table 5, variation table 6 and rule table 7, specifically, rules K3V1R4 and K3V2R5, the map engine 510 can derive that the element, firstName K30004V1, is the child of the element, field K30002V1 in APP 1 (service provider 504) and child of the element, name K30003V2, in APP 2 (service requester 502). Additionally, in some embodiments, the rule table may store user-defined mapping of elements. Using this mapping information stored in the knowledge base 514, the map engine can map the firstName element of service requester 502 to the firstName element of service provider 504 and vice versa. Based on such mapping rules the elements or parameters associated with WSDL 2 of service provider 504 that map to the parameters extracted from request 1 are identified and appropriately populated with values extracted from request 1. Using parameters populated with values as such the client 512 generates a mapped request 2, such as the SOAP message in FIG. 5g, conforming to the format of service provider 504 is generated. The client 512 invokes the requested service provided by service provider 504 using this mapped request 2. The service provider 504 generates a response 3 which is again transformed to mapped response 4 by the SOAP engine 506 using the mapping rules from the tables in the knowledge base as was used to transform request 1 to mapped request 2. The mapped response 4 is in a format supported and understood by the service requester 502.

TABLE 5

| Knowledge ID | Element ID | Name | Description |
| --- | --- | --- | --- |
| K3 | K30001 | documentRequest | Root element |
| K3 | K30002 | Field | Field element of documentRequest |
| K3 | K30003 | Name | Specifies the name |
| K3 | K30004 | firstName | Specifies the first name |

TABLE 6

| Var ID | Element ID | Variation |
| --- | --- | --- |
| K30001V1 | K30001 | App1 |
| K30002V1 | K30002 | App1 |
| K30003V2 | K30003 | App2 |
| K30004V1 | K30004 | App1 |
| K30005V2 | K30004 | App2 |

TABLE 7

| Rule ID | Var ID | Var IDM |
| --- | --- | --- |
| K3V1R1 | K30001V1 | N/A |
| K3V1R2 | K30002V1 | K30001V1 |
| K3V2R3 | K30003V2 | N/A |
| K3V1R4 | K30004V1 | K30002V1 |
| K3V2R5 | K30005V2 | K30003V2 |

According to another embodiment of the invention, the mapping rules stored in the knowledge base 514 are user-defined.

Interoperability for Web Services Implemented on Different Platforms

Figure 6A:
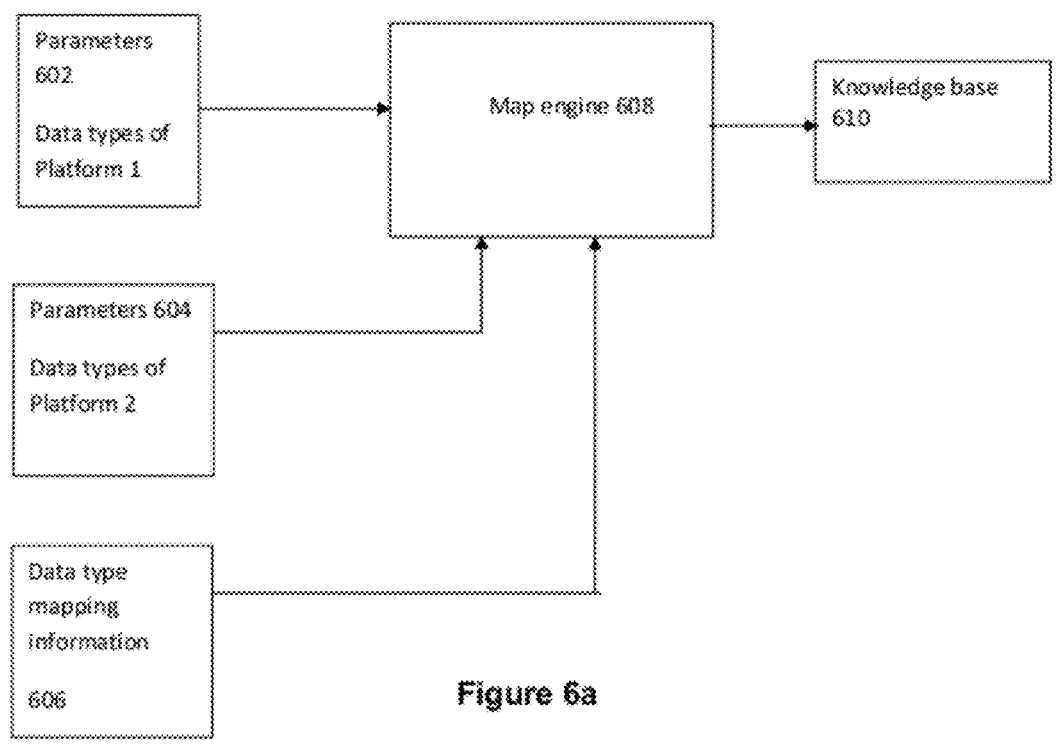
FIG. 6a is a functional block diagram according to an embodiment of the invention, comprising a map engine receiving platform data types associated with different platforms, and a knowledge base to store mapping rules between data types of different platforms.

According to another embodiment of the present invention, a knowledge base such as the knowledge base 610 shown in FIG. 6a, stores mapping rules derived from data type mapping information provided by various platform vendors. An example embodiment of the present invention as illustrated in the system of FIG. 6a comprises a map engine 608 that receives platform data types, referred hereafter as parameters, associated with different platforms. For example, the map engine 608 receives data types of platform 1, parameters 602, data types of platform 2, parameters 604, and data type mapping information 606 available from different platform vendors. FIG. 6a also comprises a knowledge base 610 that stores information associated with the parameters and corresponding mapping rules in domain table 8, variation table 9, and rule table 10. In one example, the platform 1 is a Microsoft®.NET platform and the platform 2 is a Java EE platform. The knowledge base 610 stores mapping rules for associating parameters 602, and 604 of different platform data types such .NET data types and Java EE data types to XML data type as derived from the data type mapping information. Data type mapping information 606 provided by platform vendors provides, for example, the mapping of one platform data type such as .NET data type to another data type such as XML data type.

Figure 6B:
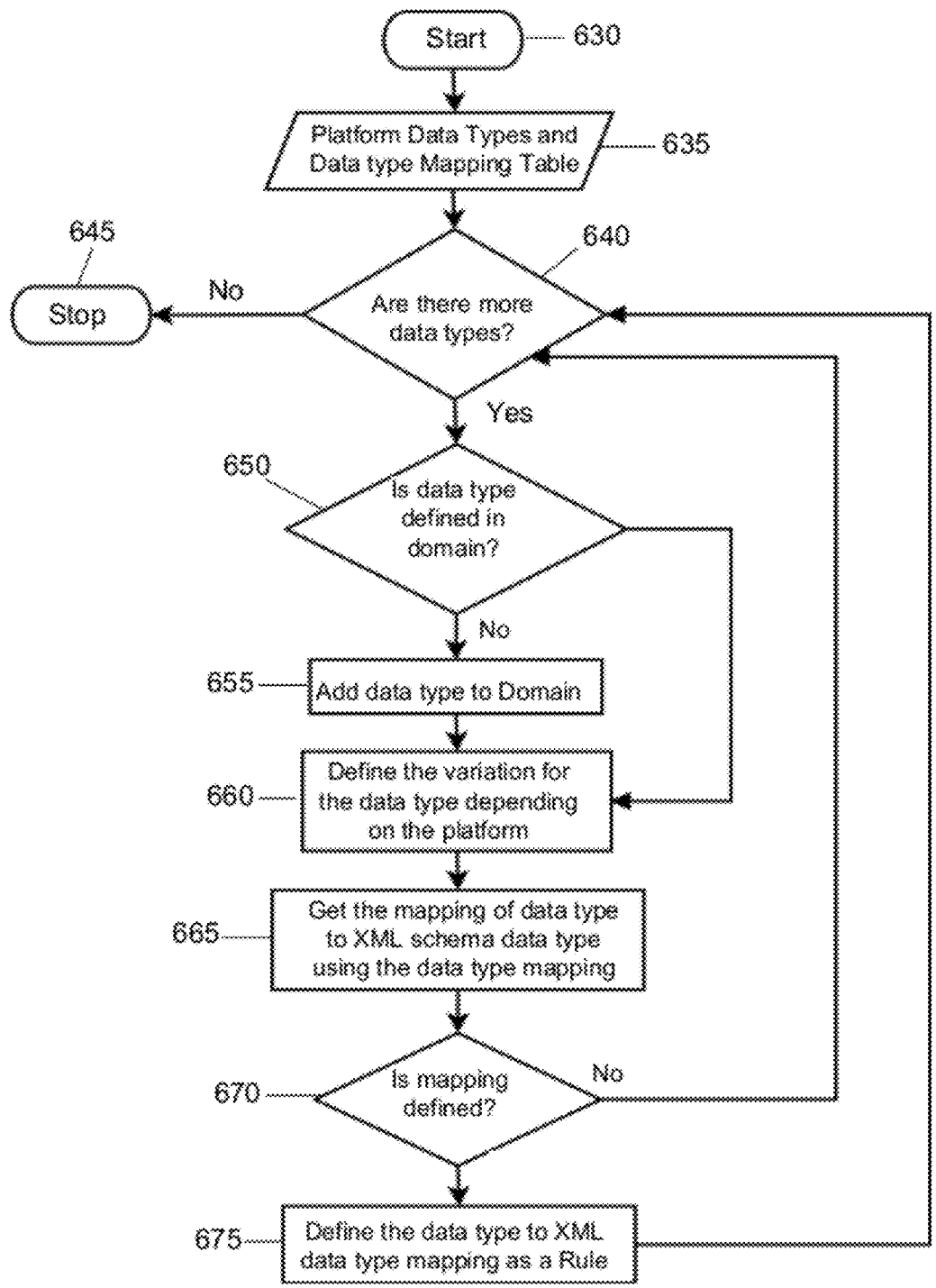
FIG. 6b is a flowchart according to an embodiment of the present invention, illustrating the operation of the map engine to store in the knowledge base mapping rules between data types of different platforms.

FIG. 6b is a flowchart illustrating the manner in which the map engine 608 assists in populating the knowledge base 610 with mapping rules. The method begins at step 630 and, at step 635, parameters 602 and parameters 604 and data type mapping information 606 is received as input. At step 640, it is determined based on the input if there is any more parameter yet to be mapped. If not, then the method stops at 645. If there is a parameter or a platform data type yet to be mapped, then, at 650, it is determined whether the parameter is defined in the domain table 8 of the knowledge base 610. If the parameter is not defined in the domain table 8, then that parameter is added to the domain table 8 at step 655. When the parameter is already defined in the domain table 8 or once it is added to the domain table 8, then the variation for that parameter is defined in the variation table 9 at step 660. The variation table 9 associates each parameter to its corresponding platform. Next, at step 665, the mapping of the parameter or platform data type to a common data type such as, XML schema data type is retrieved using the data type mapping information 606. At 670, it is determined whether the mapping is defined in the data type mapping information. If the mapping is defined, then the parameter or platform data type to XML data type mapping is defined as a rule in the rule table 10 at step 675. If the mapping is not defined, then the method returns to 620 to determine if there are more parameters or data types to be mapped. Therefore, the rule table 10 stores mapping of a variation of one platform data type to a variation of another platform data type such as an XML data type.

TABLE 8

| Knowledge ID | Element ID | Name | Description |
|---|---|---|---|
| K2 | K20001 | xs:string | String data type of XML schema |
| K2 | K20002 | Java.lang.String | String data type of Java |
| K2 | K20003 | String | String data type of .NET |
| ... | ... | ... | ... |

TABLE 9

| Var ID | Element ID | Variation |
|---|---|---|
| K20001V1 | K20001 | XML |
| K20002V1 | K20002 | Java |
| K20003V2 | K20003 | .NET |
| ... | ... | ... |

TABLE 10

| Rule ID | Var ID | Var IDM |
|---|---|---|
| K2V21R1 | K20002V1 | K20001V1 |
| K2V31R2 | K20003V1 | K20001V1 |
| ... | ... | ... |

Figure 6C:
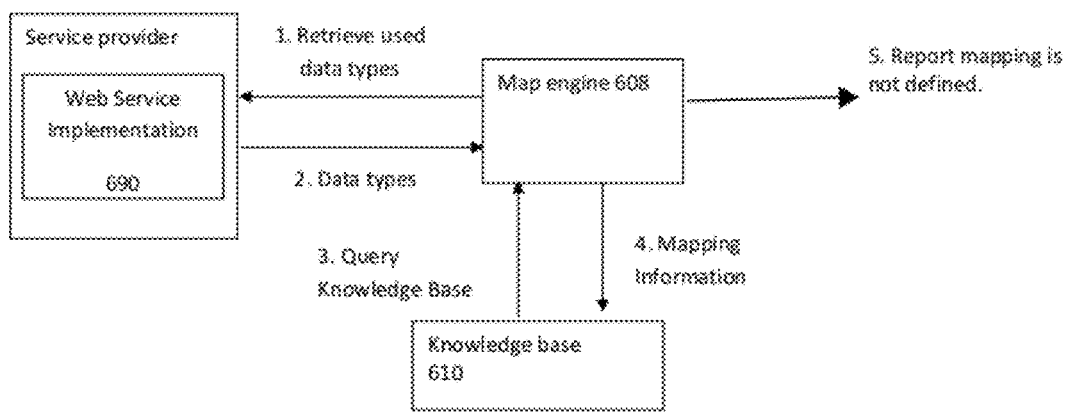
FIG. 6c is a functional block diagram illustrating an embodiment of the invention comprising evaluation by a map engine of a web service implementation against the mapping rules stored in the knowledge base 610 to provide feedback on potential interoperability issues for the web service implementation.

FIG. 6c illustrates an embodiment of the invention where the map engine 608 is capable of examining a web service implementation against the mapping rules stored in the knowledge base 610 and providing a feedback on the possibility of the implementation being incompatible with other web service implementations. In an example embodiment, the feedback provides information on the data types used in the web service implementation that may not have a mapping to another data type. This is useful information in designing web services, providing the designer an option, at design time, to choose alternate platform data types if one or more data types originally selected do not have corresponding mappings. FIG. 6c comprises a map engine 608, a knowledge base 610, and a service implementation 690 that may correspond to a web service provider and/or a web service requester. The knowledge base 610 as described above stores information associated with parameters or platform data types and mapping rules that map the parameters of one platform type to parameters of another platform or another data type, such as XML data types. In one embodiment the map engine 608 parses the web service implementation 690 to retrieve the data types used in the implementation. For each data type retrieved from the implementation 690, the map engine 608 queries the knowledge base 610 to determine whether a corresponding mapping rule that maps the retrieved data type to another data type is stored in the knowledge base 610. In one embodiment, based on the result of the queries to the knowledge base 610, the map engine 608 generates a report. In one embodiment the report indicates a positive result when all the retrieved data types have a mapping rule defined the knowledge base 610. In some other embodiment, the report may include a list of all data types for which the knowledge base 610 was queried with a positive result. In another embodiment, the report includes a list of platform data types of the implementation 690 that do not have a corresponding mapping rule in the knowledge base 610. Based on the output from the map engine 608, a web service designer may decide to choose an alternate data type for the implementation. In one embodiment the web service designer may initiate a request for the map engine 608 to examine the service implementation 690 for potential incompatibility with other data types. In another embodiment, the map engine 608 may be directly queried with specific parameters or platform data types to determine whether the knowledge base 610 stores mapping rules for those specific parameters.

As a result of certain embodiments of the invention discussed above, the problem of interoperability between incompatible applications due to varying standards, heterogeneous platforms, and outbound web services can be resolved by the map engine operating either independently or with access to the knowledge base. According to some embodiments, the mapping information stored in the knowledge base can be updated transparently with the standards, platform data types and user inputs. The updates can be initiated with updates in the WSDL documents, standard or platform specifications, or as defined by the end user. Embodiments of the invention, therefore, require little development effort to transform the SOAP messages. It may be appreciated that one or more combinations of interoperability scenarios discussed above may be present between two web service applications and one of ordinary skill in the technical area will be able to address such combinations of interoperability scenarios from one or more embodiments of the invention.

In some embodiments, processor 210, along with map engine module 225, comprised in the apparatus 200 of FIG. 2, are configured to cause the apparatus 200 to perform mapping between a service requester and a service provider with incompatible implementations or different formats. Map engine module 225 can cause apparatus 200 to receive a request, from the service requester, to access a service provided by the service provider. The map engine module 225 is capable of deriving the parameters from the request and a map of values for the parameters. Processor 210, with the map engine module 225, is configured to control the apparatus 200 to access respective descriptions of the service requester and the service provider. The description may be, for example, a WSDL of the service provider or a standard specification. Map engine module 225 generates a mapping between the different formats of the service requester and the service provider based on at least one mapping rule. In one embodiment, the mapping rule(s) is dynamically derived by the map engine module 225 based, on the process illustrated in the flowchart of FIG. 5b. In another embodiment, map engine module 225 accesses knowledge base 235 and retrieves the mapping rule(s) stored therein.

The at least one mapping rule includes a collection of data representing the mapping between the elements of the messages associated with an implementation of the service provider and an implementation of the service requester. The at least one mapping rule may be automatically or dynamically derived using a WSDL of the service provider and a WSDL of the service requester, using a data type mapping information defined by platform vendors, or using a standard specification.

Processor 210, with the map engine module 225, is further configured to control the apparatus 200 to populate the mapped parameters with appropriate values extracted from the request. Output from the apparatus 200 comprising the mapped parameters with their corresponding values can be used by a web service client of the service provider to generate a SOAP message in accordance with the format of the service provider. Apparatus 200 also enables mapping a response from the service provider to a format supported by the service requester. Apparatus 200 can then transmit or provide the mapped response to the service requester.

In certain embodiments, processor 210, map engine module 225, and other functional modules 230 may be implemented as separate physical and logical units or may be implemented in a single physical and logical unit. Furthermore, in some embodiments, processor 210, map engine module 225, and other functional modules 230 may be implemented in hardware, or as any suitable combination of hardware and software. In one embodiment, the functionality of the map engine module 225 as described in the embodiments of the invention may itself be provided as a service over the Internet.

In one embodiment of the invention, the knowledge base 235 include a database server and any type of database, such as a relational or flat file database where the knowledge base 235 is capable of receiving a query such as a request from map engine 225 or any other application where the request is for identifying an element that maps to the element included in the request. In other words, the knowledge base 235 is capable of receiving and responding to a request for a mapping rule. In one embodiment, the knowledge base 235 is a specialized database or information storage system for knowledge management. Generically, a knowledge base 235 is meant to provide the means for the computerized collection, organization, and retrieval of knowledge. Machine-readable knowledge bases store knowledge in a computer-readable form. One purpose for the storage of such knowledge bases is to have automated deductive reasoning applied to them. Knowledge bases may contain a set of data in the form of rules or tables that describe the knowledge in a logically consistent manner. Ontology can define the structure of stored data, such as what types of entities are recorded and what their relationships are. Logical operators may be used to build up a knowledge base from simpler pieces of information.

Embodiments of the invention may also include a computer program embodied on a non-transitory computer readable storage medium. The computer program may include computer code or instructions that, when executed by a processor, cause the processor to execute any of the methods described herein, such as the methods illustrated in FIGS. 3, 4b, 5b, and 6b. In other embodiments, the functionality may be performed by hardware (e.g., through the use of an application specific integrated circuit (ASIC), a programmable gate array (PGA), a field programmable gate array (FPGA), etc.) or any other combination of hardware and software.

It should be noted that many of the functional features described in this specification have been presented as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer implemented method for retrieving a mapping rule based on a first parameter, wherein the mapping rule enables mapping a first message in a first message format to a second message in a second message format, the second message format being different from the first message format, the method comprising:
   identifying a first parameter associated with the first message in response to receiving the first message from a first application, wherein the first message format is associated with the first application;
   identifying a first value of the first parameter;
   identifying a first variation associated with the first parameter;

identifying the mapping rule for the first variation, wherein the mapping rule provides a second variation associated with the first variation;

identifying a second parameter associated with the second variation, wherein the second parameter is associated with the second message format;

populating the second parameter with the first value; and generating the second message in the second message format based on the second parameter populated with the first value.

2. The computer implemented method of claim 1 further comprising invoking an operation of the second application based on the second message wherein the second message format is associated with the second application.

3. The computer implemented method of claim 2 further comprising:

receiving from the second application a third message in response to the second message;

mapping the third message to a fourth message based on a second mapping rule wherein the second mapping rule maps a third variation with a fourth variation; and transmitting the fourth message to the first application, wherein the third message is in the second message format and the fourth message is in the first message format.

4. The computer implemented method of claim 3 wherein the first message, the second message, the third message, and the fourth message are SOAP messages.

5. The computer implemented method of claim 1 wherein the mapping rule is retrieved from information stored in a plurality of database tables.

6. A computer implemented mapping system for allowing communication between a service requester having a first message format and a service provider having a second message format different from the first message format, the system comprising:

a processor coupled to a memory device that stores instructions that when executed by the processor implements a map engine coupled to a knowledge base;

the map engine for enabling transformation of a message in the first message format to a message in the second message format; and the knowledge base coupled to the map engine and stored in a computer database for providing mapping rules to the map engine, the processor when executing the instructions further comprising:

identifying a first parameter associated with the first message in response to receiving the first message from a first application, wherein the first message format is associated with the first application;

identifying a first value of the first parameter;

identifying a first variation associated with the first parameter;

identifying the mapping rule for the first variation, wherein the mapping rule provides a second variation associated with the first variation;

identifying a second parameter associated with the second variation, wherein the second parameter is associated with the second message format;

populating the second parameter with the first value; and generating the second message in the second message format based on the second parameter populated with the first value.

7. The computer implemented mapping system of claim 6 wherein in response to receiving, from the map engine, a request comprising a first element the knowledge base is capable of returning a second element of the plurality of elements, wherein the first element is associated with the first variation and the second element is associated with the second variation.

8. The system of claim 6 wherein the first variation corresponds to at least one of a version, a platform or an application type.

9. The system of claim 6 wherein the first parameter is associated with a first description and the second parameter is associated with a second description, wherein the first description and the second description is a SOAP specification, or a WSDL document associated with the first application and the second application.

10. The system of claim 9 wherein, the first description corresponds to a list of platform data types of the first application and the second description corresponds to a list of platform data types of the second application wherein the first application and the second application are implemented on different platforms, and wherein the mapping between the first variation and the second variation is through a third variation associated with an XML data type stored in the two or more tables.

11. A non-transitory computer-readable medium having instructions stored thereon that, when executed by a processor, cause the processor to map messages for web services, the mapping comprising:

identifying a first parameter associated with a first message in a first message format in response to receiving the first message from a first application, wherein the first message format is associated with the first application;

identifying a first value of the first parameter;

identifying a first variation associated with the first parameter;

identifying a mapping rule for the first variation, wherein the mapping rule provides a second variation associated with the first variation;

identifying a second parameter associated with the second variation, wherein the second parameter is associated with a second message format;

populating the second parameter with the first value; and generating the second message in the second message format based on the second parameter populated with the first value.

12. The computer-readable medium of claim 11, further comprising invoking an operation of the second application based on the second message, wherein the second message format is associated with the second application.

13. The computer-readable medium of claim 12, further comprising:

receiving from the second application a third message in response to the second message;

mapping the third message to a fourth message based on a second mapping rule wherein the second mapping rule maps a third variation with a fourth variation; and transmitting the fourth message to the first application;

wherein the third message is in the second message format and the fourth message is in the first message format.

14. The computer-readable medium of claim 13, wherein the first message, the second message, the third message, and the fourth message are SOAP messages.

15. The computer-readable medium of claim 13, wherein the mapping rule is retrieved from information stored in a plurality of database tables.

* * * * *

UNITED STATES PATENT AND TRADEMARK OFFICE
CERTIFICATE OF CORRECTION

| | | |
|---|---|---|
| PATENT NO. | : 8,667,061 B2 | Page 1 of 1 |
| APPLICATION NO. | : 12/959915 | |
| DATED | : March 4, 2014 | |
| INVENTOR(S) | : Kumar | |

It is certified that error appears in the above-identified patent and that said Letters Patent is hereby corrected as shown below:

In the Specification

In column 2, line 47, delete "variations," and insert -- variations. --, therefor.

In column 3, line 36, delete "variation," and insert -- variation. --, therefor.

Signed and Sealed this
Eighth Day of July, 2014

Michelle K. Lee
*Deputy Director of the United States Patent and Trademark Office*